US010633077B2

(12) United States Patent
Sauvinet

(10) Patent No.: US 10,633,077 B2
(45) Date of Patent: Apr. 28, 2020

(54) AIRCRAFT EXHIBITING INDEPENDENT ELEVATORS

(71) Applicant: Airbus Operations S.A.S., Toulouse (FR)

(72) Inventor: Frédéric Sauvinet, Tournefeuille (FR)

(73) Assignee: Airbus Operations S.A.S. (FR)

( * ) Notice: Subject to any disclaimer, the term of this patent is extended or adjusted under 35 U.S.C. 154(b) by 420 days.

(21) Appl. No.: 15/618,294

(22) Filed: Jun. 9, 2017

(65) Prior Publication Data

US 2017/0361917 A1 Dec. 21, 2017

(30) Foreign Application Priority Data

Jun. 16, 2016 (FR) ..................... 16 55599

(51) Int. Cl.
| | |
|---|---|
| *B64C 9/00* | (2006.01) |
| *B64C 5/10* | (2006.01) |
| *B64C 9/02* | (2006.01) |
| *B64C 5/02* | (2006.01) |
| *B64C 5/06* | (2006.01) |
| *B64C 39/12* | (2006.01) |

(52) U.S. Cl.
CPC ............... *B64C 9/00* (2013.01); *B64C 5/02* (2013.01); *B64C 5/06* (2013.01); *B64C 5/10* (2013.01); *B64C 9/02* (2013.01); *B64C 39/12* (2013.01)

(58) Field of Classification Search
CPC .... B64C 9/00; B64C 9/02; B64C 5/02; B64C 5/06; B64C 5/10
See application file for complete search history.

(56) References Cited

U.S. PATENT DOCUMENTS 4,099,687 A * 7/1978 Roberts .................. B64C 5/10
244/213
4,261,533 A * 4/1981 Roberts .................. B64C 5/10
244/213

(Continued)

FOREIGN PATENT DOCUMENTS

EP 0 033 053 A1 8/1981
EP 2 327 624 A2 6/2011

(Continued)

OTHER PUBLICATIONS

FR 16 55599—Search Report dated Jan. 31, 2017.

*Primary Examiner* — Philip J Bonzell
*Assistant Examiner* — Tye William Abell
(74) *Attorney, Agent, or Firm* — Lerner, David, Littenberg, Krumholz & Mentlik, LLP

(57) ABSTRACT

An aircraft includes a structure exhibiting a median plane XZ and including a fuselage, a fixed vertical stabilizer at the rear of the fuselage, an adjustable horizontal stabilizer rotatably mounted about a horizontal axis on a first section of the structure, and extending on either side of the median plane XZ, and at the rear, two elevators mounted rotatably about a horizontal axis on a second section of the structure on either side of the median plane XZ independently of the adjustable horizontal stabilizer. In an aircraft of this kind, the elevators no longer have any impact on the adjustable horizontal stabilizer, which allows, among other things, the dimensions of the adjustable horizontal stabilizer, and also of the actuator operating them, to be reduced.

2 Claims, 3 Drawing Sheets

(56) References Cited

U.S. PATENT DOCUMENTS

| | | | | |
|---|---|---|---|---|
| 4,381,091 A | * | 4/1983 | Pegram | B64C 9/00 |
| | | | | 244/130 |
| 4,598,888 A | * | 7/1986 | Beteille | B64C 39/12 |
| | | | | 244/178 |
| 4,790,494 A | | 12/1988 | Kohn | |
| 2016/0325821 A1 | * | 11/2016 | Golshany | B64C 1/26 |

FOREIGN PATENT DOCUMENTS

| | | |
|---|---|---|
| FR | 2 993 859 A1 | 1/2014 |
| WO | 98/21092 A1 | 5/1998 |
| WO | 00/07875 A1 | 2/2000 |

* cited by examiner

AIRCRAFT EXHIBITING INDEPENDENT ELEVATORS

FIELD OF THE INVENTION

The present invention relates to an aircraft exhibiting an adjustable horizontal stabilizer (AHS) and elevators separate from the adjustable horizontal stabilizer.

BACKGROUND OF THE INVENTION

FIG. 1 is a plan view of a state-of-the-art aircraft 10 which comprises a fuselage 12, on either side of which is fixed a wing 14a-b which supports one or more engine(s) 16a-b.

To the rear, the aircraft 10 likewise comprises a horizontal stabilizer 18a-b which is rotatable about a horizontal axis and which extends on either side of the fuselage 12. A horizontal stabilizer of this kind is referred to as an adjustable horizontal stabilizer (AHS).

The aircraft 10 likewise exhibits, mounted on either side of the fuselage 12 and on the adjustable horizontal stabilizer 18a-b, an elevator 20a-b which is rotatable about a horizontal axis and which is positioned on the trailing edge of the adjustable horizontal stabilizer 18a-b. The elevator 20a-b is fixed to the adjustable horizontal stabilizer 18a-b by a hinge.

The aircraft 10 likewise comprises a vertical stabilizer 22 at the rear of which a rudder 24 is movably mounted about a vertical axis.

The adjustable horizontal stabilizer 18a-b is operated by an actuator and ensures the long-term trim of the aircraft 10. Each elevator 20a-b is likewise operated by one or more other actuators and ensures the short-term trim of the aircraft 10, as well as maneuvers of the aircraft 10.

When an elevator 20a-b is deflected upwards, it reduces the stalling incidence of the adjustable horizontal stabilizer 18a-b. This stalling incidence plays an important part during a dive maneuver (manual) of the aircraft 10 in re-establishing speed and the reduction in the stalling incidence leads to an increase in the size of the adjustable horizontal stabilizer 18a-b to balance out the effects of this reduction.

Moreover, the deflection of the elevator 20a-b generates a large variation in the hinge moment on the adjustable horizontal stabilizer 18a-b and therefore a strong axial force on the actuator operating the adjustable horizontal stabilizer 18a-b.

In order to balance these elements, it is then necessary for the adjustable horizontal stabilizer 18a-b and each actuator to be oversized, which has an impact on the weight and volume of the equipment and on its energy needs.

BRIEF SUMMARY OF THE INVENTION

An aspect of the present invention proposes an aircraft exhibiting an adjustable horizontal stabilizer and elevators separate from the adjustable horizontal stabilizer.

To this end, an aircraft is proposed comprising:
a structure exhibiting a median plane XZ and comprising:
a fuselage, and
a fixed vertical stabilizer at the rear of the fuselage,
an adjustable horizontal stabilizer rotatably mounted about a horizontal axis on a first section of the structure, on either side of the median plane XZ, and at the rear, two elevators mounted rotatably about a horizontal axis on a second section of the structure on either side of the median plane XZ independently of the adjustable horizontal stabilizer.

In an aircraft of this kind, elevators no longer have any impact on the adjustable horizontal stabilizer, which allows, among other things, the dimensions of the adjustable horizontal stabilizer, and also of the actuator operating them, to be reduced.

According to a particular embodiment, the first section of the structure is a rear section of the fuselage.

According to a first variant, the second section of the structure is the vertical stabilizer.

According to a second variant, the second section of the structure is a front section of the fuselage.

According to another particular embodiment, the first section of the structure is the vertical stabilizer.

According to a first variant, the second section of the structure is a rear section of the fuselage.

According to a second variant, the second section of the structure is a front section of the fuselage.

Advantageously, the vertical stabilizer exhibits a leading edge and a trailing edge and the structure exhibits on the inside of the vertical stabilizer:
a front longeron extending along the leading edge,
a rear longeron extending along the trailing edge,
an intermediate longeron fixed between the front longeron and the rear longeron and on which each elevator is rotatably mounted, and
for each elevator, at least one actuator mounted in an articulated manner between the intermediate longeron and the elevator.

BRIEF DESCRIPTION OF THE DRAWINGS

The characteristics of the invention referred to above, and also others, will become clearer on reading the following description of an exemplary embodiment, said description relating to the attached drawings, in which.

DETAILED DESCRIPTION

Figure 1:
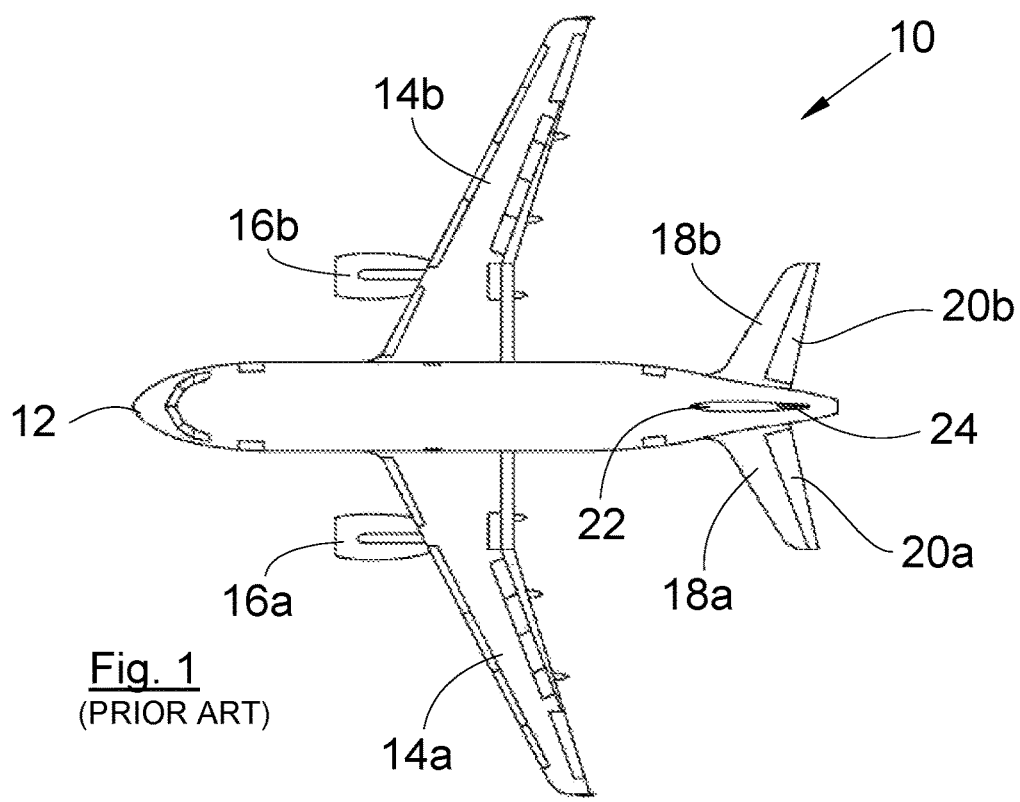
FIG. 1 is a plan view of a state-of-the-art aircraft.
Figure 2:
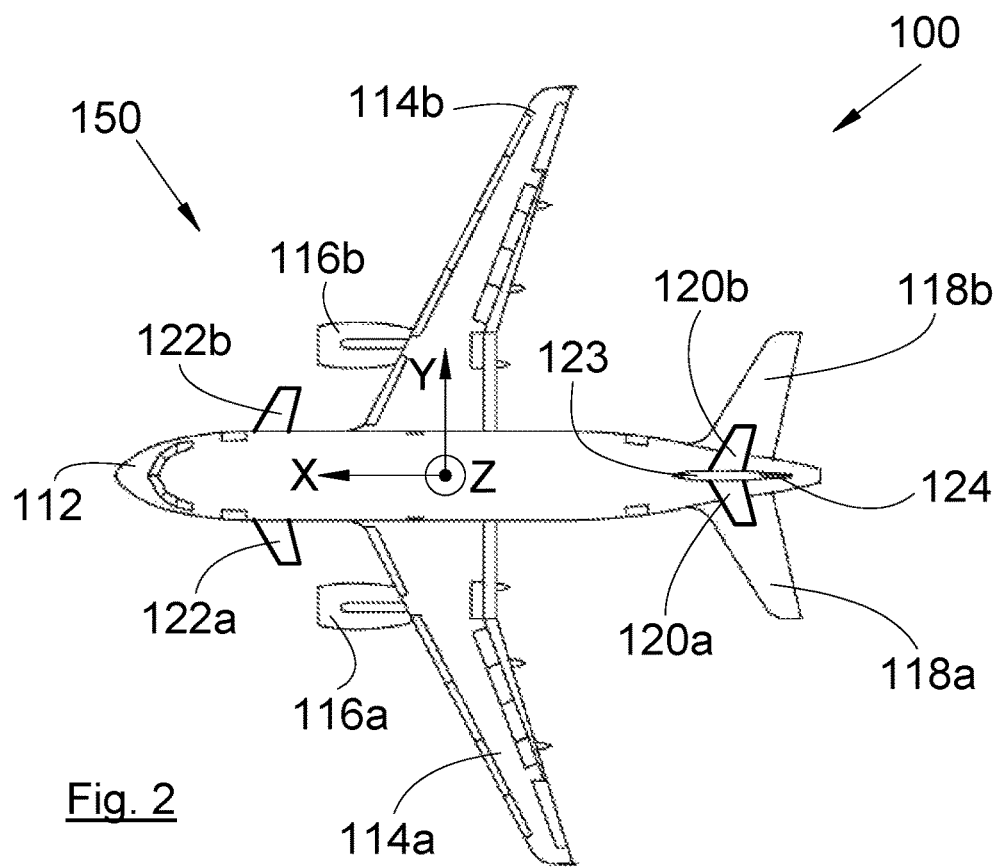
FIG. 2 is a plan view of an aircraft according to a first embodiment and a second embodiment of the invention.
Figure 3:
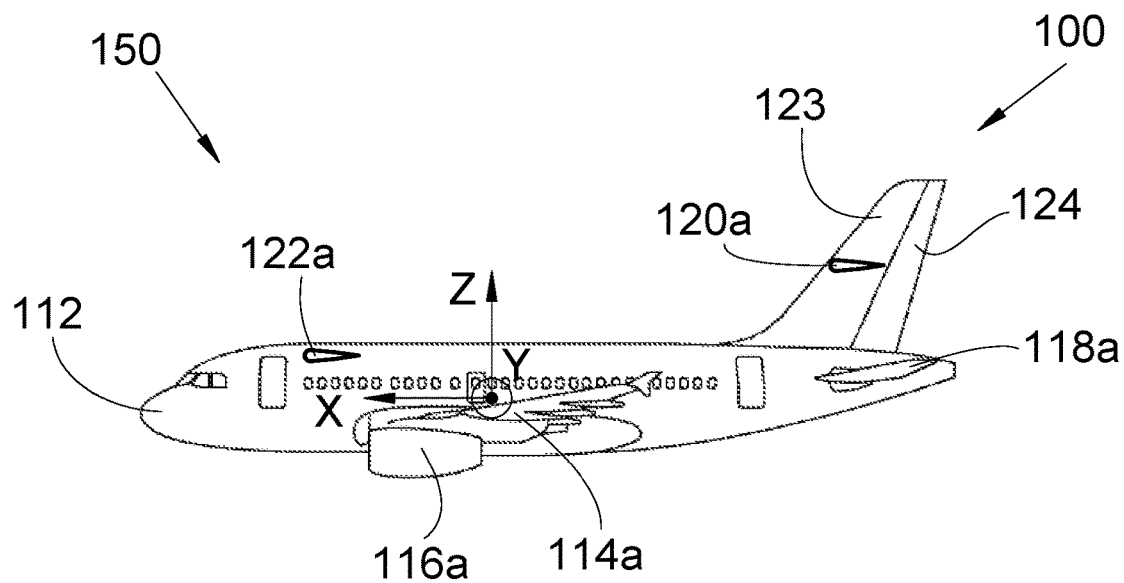
FIG. 3 is a side view of an aircraft according to the first embodiment and the second embodiment of the invention.
Figure 4:
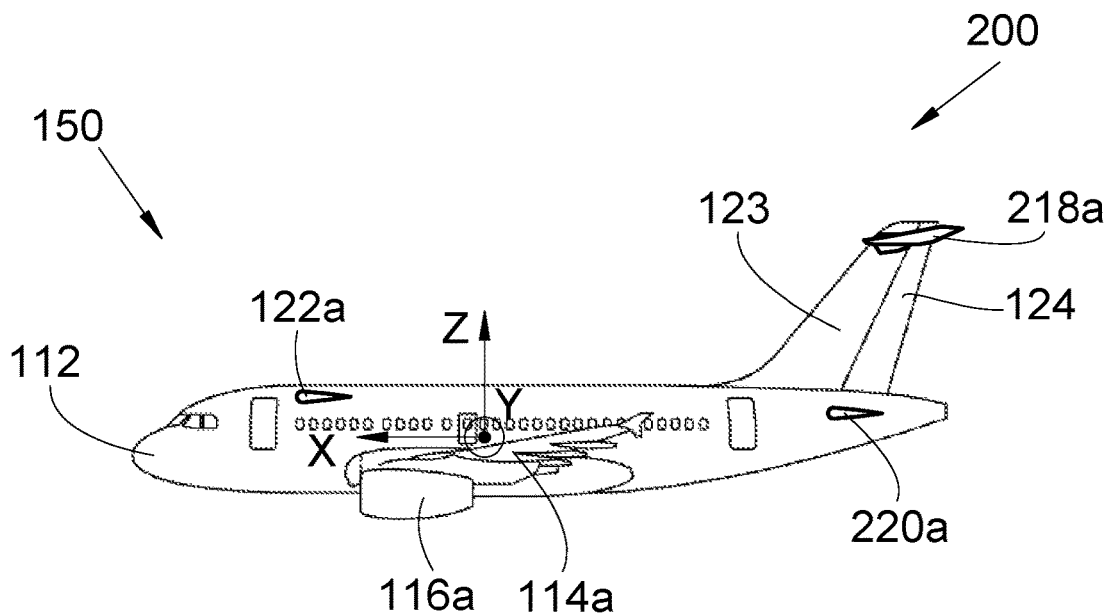
FIG. 4 is a side view of an aircraft according to another embodiment of the invention.
Figure 5:
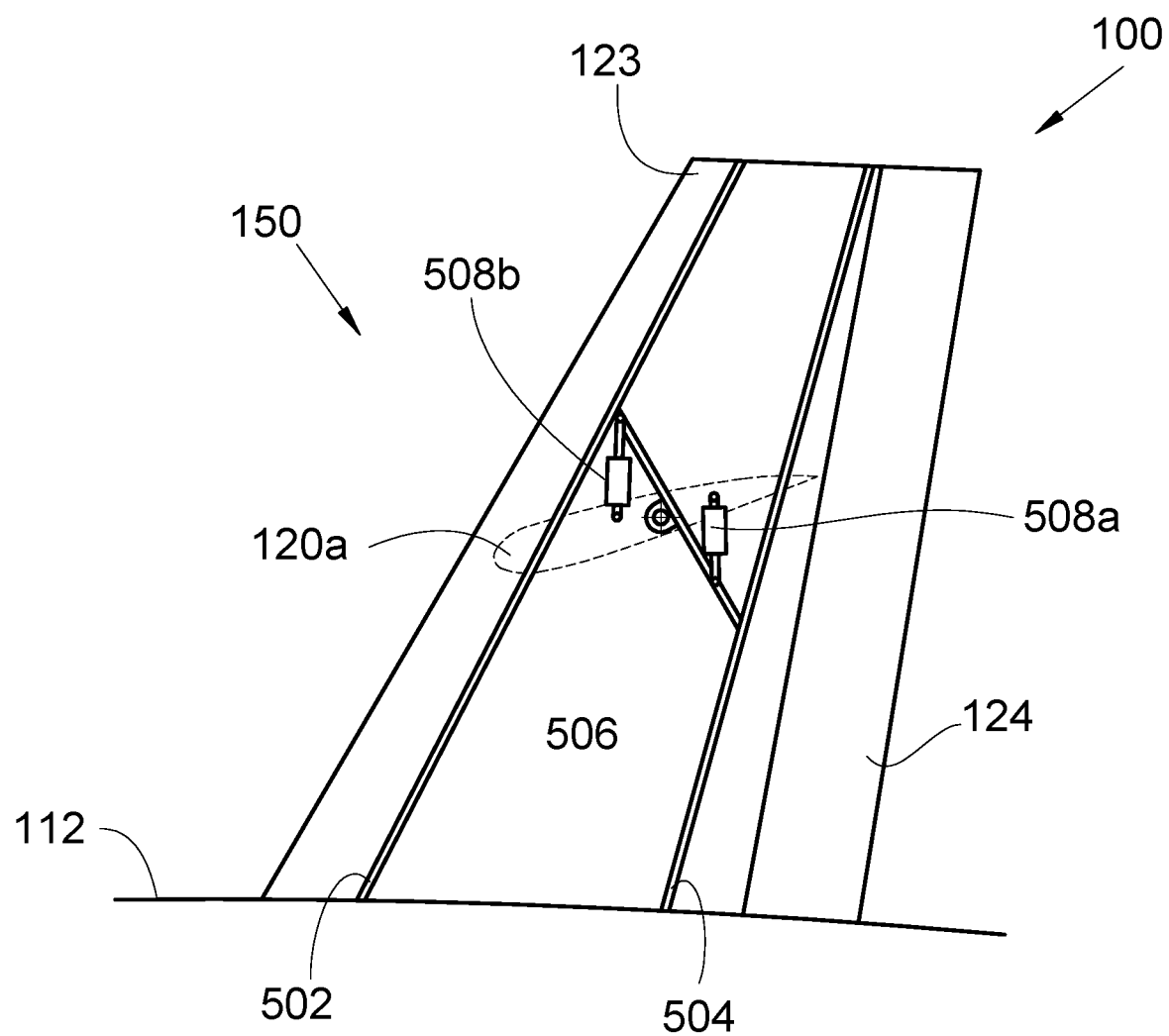
FIG. 5 is a side view of a vertical stabilizer of an aircraft according to a particular embodiment of the invention.

FIG. 2 and FIG. 3 show an aircraft 100 according to a first and a second embodiment of the invention, and FIG. 4 shows an aircraft 200 according to a third embodiment of the invention.

In the following description, and by convention, X will be used to refer to the longitudinal axis of the aircraft 100, 200 or the roll axis, oriented positively in the direction of travel of the aircraft 100, 200; Y will be used to refer to the transverse axis or the pitch axis of the aircraft 100, 200 which is horizontal when the aircraft 100, 200 is on the ground, and Z to refer to the vertical axis or vertical height or the yaw axis when the aircraft 100, 200 is on the ground, these three directions X, Y and Z being at right angles to one another and forming a system of orthogonal coordinates originating from the center of gravity of the aircraft 100, 200.

The aircraft 100, 200 comprises a structure 150 which exhibits a central plane of symmetry which is the plane XZ and which comprises, among other things, a fuselage 112 and a fixed vertical stabilizer 123 at the rear of the fuselage 112.

The aircraft 100, 200 comprises two fixed wings 114a-b on either side of the fuselage 112 where each one supports at least one engine 116a-b.

The aircraft 100, 200 likewise comprises a rudder 124 movably mounted on the rear of the vertical stabilizer 123.

For the first and the second embodiment of the invention, the aircraft 100 comprises a horizontal stabilizer 118a-b at the rear which is adjustable, in other words rotatable about a horizontal axis, and which extends on either side of the median plane XZ. The adjustable horizontal stabilizer 118a-b does not exhibit an elevator on its trailing edge.

For the third embodiment of the invention, the aircraft 200 comprises at the rear, on either side of the vertical stabilizer 123, an adjustable horizontal stabilizer 218a. The adjustable horizontal stabilizer 218a does not exhibit an elevator on its trailing edge.

In general terms, the aircraft 100, 200 exhibits an adjustable horizontal stabilizer 118a-b, 218a which is mounted rotatably about a horizontal axis on a first section of the structure 150 of the aircraft 100, 200 and which extends on either side of its median plane XZ, and at the rear of the fuselage.

In the first and the second embodiment, the first section of the structure 150 is made up of the rear section of the fuselage 112.

In the third embodiment, the first section of the structure 150 is made up of the vertical stabilizer 123, thereby forming a T-tail.

The aircraft 100, 200 likewise exhibits two elevators 120a-b, 122a-b, 220a (only one of them can be seen in FIG. 4).

According to the first embodiment of the invention, the elevators 120a-b are mounted on the vertical stabilizer 123, on either side thereof. Each elevator 120a-b is rotatable about a horizontal axis.

According to the second embodiment of the invention, the elevators 122a-b are mounted on the fuselage 112, on either side thereof and at the front thereof, thereby adopting a so-called "canard" configuration. Each elevator 122a-b is rotatable about a horizontal axis.

According to the third embodiment of the invention, the elevators 220a are mounted on the fuselage 112, on either side thereof and at the rear thereof, in other words, substantially on the vertical projection of the vertical stabilizer 123.

In general terms, the aircraft 100, 200 comprises two elevators 120a-b, 122a-b, 220a which are mounted rotatably about a horizontal axis on a second section of the structure 150 of the aircraft 100, 200 on either side of the median plane XZ and independently of the adjustable horizontal stabilizer 118a-b, 218a, in other words, separate therefrom and outside its trailing edge.

In the first embodiment, the second section of the structure 150 is made up of the vertical stabilizer 123.

In the second embodiment, the second section of the structure 150 is made up of the front section of the fuselage 112.

In the third embodiment, the second section of the structure 150 is made up of the rear section of the fuselage 112.

Whether they are positioned on the front section or the rear section of the fuselage 112, the elevators 122a-b, 220a must be spaced apart from the center of gravity of the aircraft 100, 200, in order to produce a pitching moment.

For each elevator 120a-b, 122a-b, 220a and the adjustable horizontal stabilizer 118a-b, 218a, the aircraft 100, 200 exhibits one or several actuator(s) which may be controlled from the cockpit of the aircraft 100, 200 and which operate said elevator 120a-b, 122a-b, 220a or said adjustable horizontal stabilizer 118a-b, 218a.

An aircraft 100, 200 of this kind in which each elevator 120a-b, 122a-b, 220a is independent of the adjustable horizontal stabilizer 118a-b, 218a allows the dimensions of the adjustable horizontal stabilizer 118a-b, 218a, and those of the actuator operating it, to be reduced, since the elevator 120a-b, 122a-b, 220a no longer has any influence on the adjustable horizontal stabilizer 118a-b, 218a and the stalling incidence.

In the same way, the lack of an actuator for the elevator on the adjustable horizontal stabilizer 118a-b, 218a reduces the drag.

It is then possible to optimize the aerodynamic properties of each elevator 120a-b, 122a-b, 220a and of the adjustable horizontal stabilizer 118a-b, 218a without having to take account of the constraints associated with the other in each case, in other words, the adjustable horizontal stabilizer 118a-b, 218a and the elevator 120a-b, 122a-b, 220a.

As the surfaces are smaller, the wingspan is smaller and the effectiveness is improved thanks to lower flexibility.

When the elevators 120a-b, 122a-b are not behind the wings 114a-b (first and second embodiments), they are not going to be subject to deflections of the wings 114a-b and will have greater effectiveness.

When the elevators 220a-b are fixed on the vertical stabilizer 123 (third embodiment), they may be positioned in such a manner as to improve the effectiveness of the rudder 124 and reduce the dimensions of the vertical stabilizer 123.

According to another embodiment based on the third embodiment, it is possible to replace the elevators 220a of the rear section of the fuselage 112 with canard-type elevators 122a on the front section of the fuselage 112.

FIG. 4 shows a method of fixing an elevator 120a to the vertical stabilizer 123. The internal structure of the vertical stabilizer 123 which forms part of the structure 150 of the aircraft 100 exhibits a front longeron 502 which extends along the leading edge of the vertical stabilizer 123 and a rear longeron 504 which extends along the trailing edge of the vertical stabilizer 123.

The internal structure of the vertical stabilizer 123 likewise includes an intermediate longeron 506 fixed between the front longeron 502 and the rear longeron 504 and on which each elevator 120a-b is rotatably mounted.

The rotational displacement of each elevator 120a-b is controlled by at least one actuator 508a-b, in this case there are two of them, mounted in an articulated manner between the intermediate longeron 506 and said elevator 120a-b.

The actuator 508a-b or each actuator 508a-b is traditionally controlled from the cockpit of the aircraft 100.

In embodiments in which the elevators 122a-b, 220a are fixed on the fuselage 112, the actuator may be located on the inside of the fuselage 112.

The independence of the adjustable horizontal stabilizer 118a-b, 218a and the elevator 120a-b, 122a-b, 220a makes it possible to balance each elevator 120a-b, 122a-b, 220a aerodynamically with regard to its rotational axis by centering it, which allows the hinge moment to be reduced and, by reduction of the lever arm with respect to the rotational axis, likewise to reduce its inertia. These two reductions allow the dimensions of the actuator to be reduced.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
    a structure having a median plane (XZ) and comprising:
        a fuselage;
        a fixed vertical stabilizer at the rear of the fuselage;
    an adjustable horizontal stabilizer rotatably mounted about a horizontal axis on a first section of the structure, and extending on either side of the median plane (XZ), and not including an elevator on a trailing edge of the adjustable horizontal stabilizer;
    a first pair of elevators mounted rotatably about a horizontal axis on a second section of the structure on either side of the median plane (XZ) independently of the adjustable horizontal stabilizer,
    wherein the first section of the structure is a rear section of the fuselage, and
    wherein the second section of the structure is the vertical stabilizer.

2. The aircraft as claimed in claim 1, wherein the vertical stabilizer comprises a leading edge and a trailing edge and the structure comprises on the inside of the vertical stabilizer:
    a front longeron extending along the leading edge;
    a rear longeron extending along the trailing edge;
    an intermediate longeron fixed between the front longeron and the rear longeron and on which each of the first and second elevators is rotatably mounted, and
    for each of the first and second elevators, at least one actuator mounted in an articulated manner between the intermediate longeron and the elevator.

* * * * *